W. B. KNICKERBOCKER.
WOODWORKING MACHINE.
APPLICATION FILED JUNE 19, 1918.

1,300,415.

Patented Apr. 15, 1919.
4 SHEETS—SHEET 2.

Witnesses:
Robert H. Weir
Arthur W. Carlson

Inventor
William B. Knickerbocker
Jones Bain & Bean
Attys

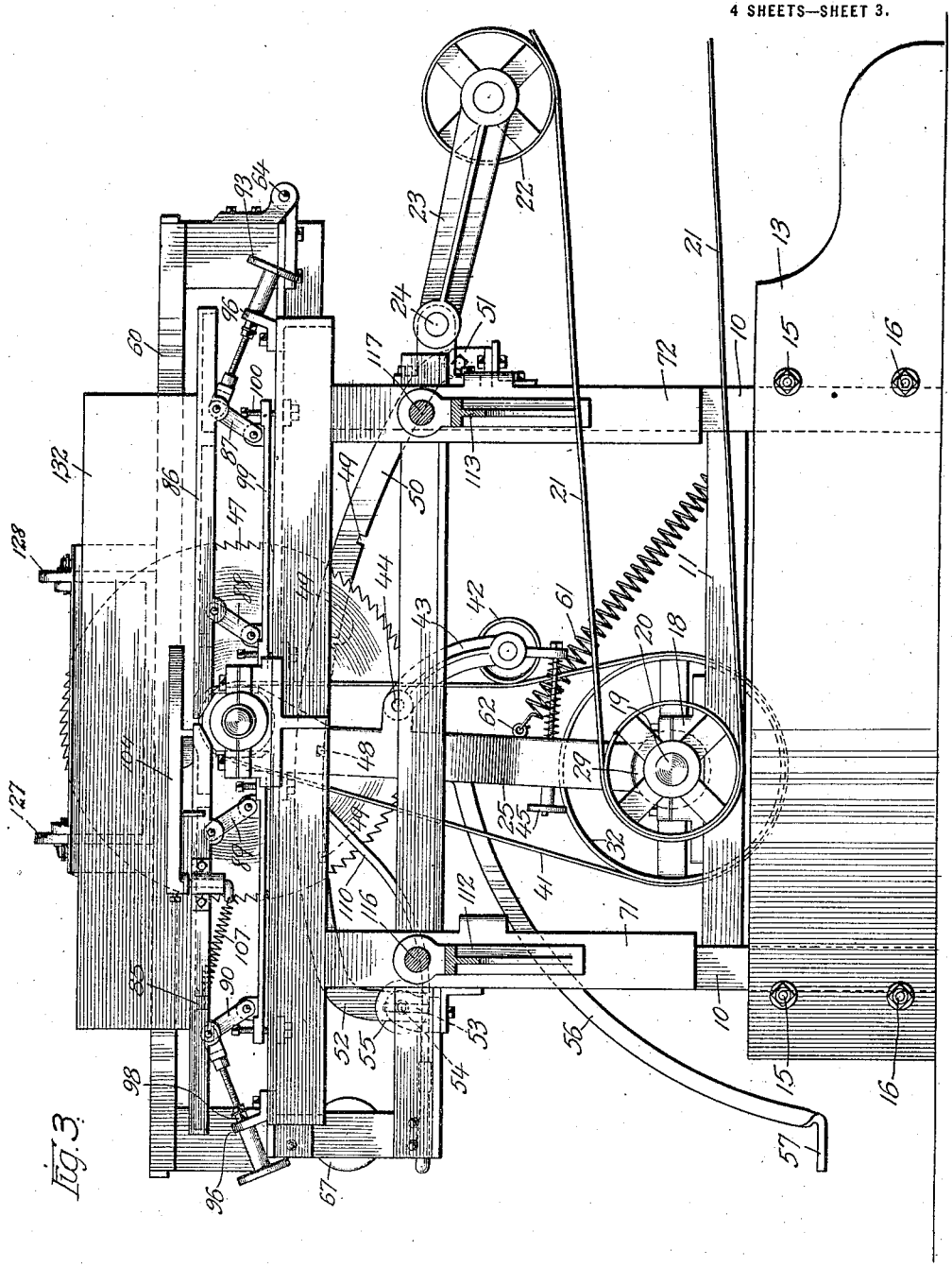

W. B. KNICKERBOCKER.
WOODWORKING MACHINE.
APPLICATION FILED JUNE 19, 1918.
1,300,415.
Patented Apr. 15, 1919.
4 SHEETS—SHEET 4.
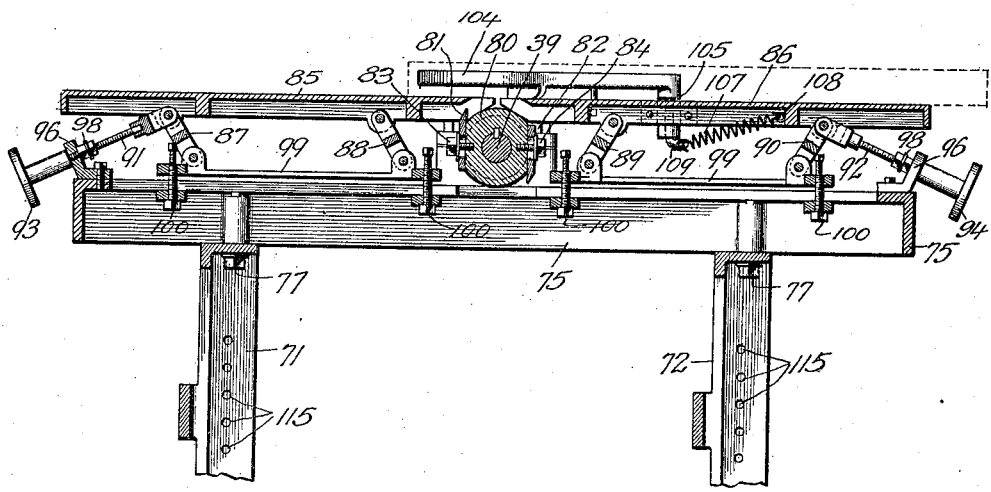
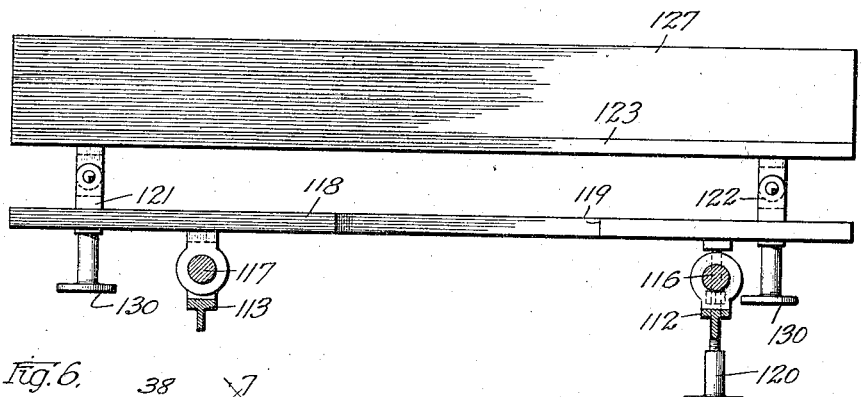
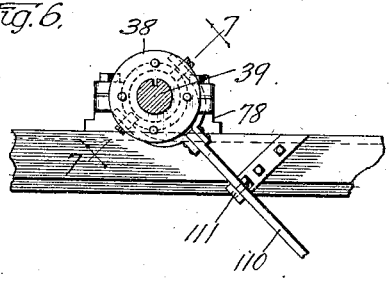
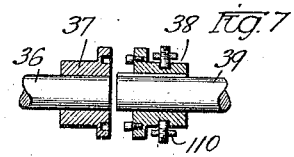
Witnesses:
Robert H. Weir
Arthur N. Carlson
Inventor
William B. Knickerbocker
Foree Bain & Bean
Attys.

UNITED STATES PATENT OFFICE.

WILLIAM B. KNICKERBOCKER, OF JACKSON, MICHIGAN.

WOODWORKING-MACHINE.

1,300,415.  Specification of Letters Patent.  Patented Apr. 15, 1919.

Application filed June 19, 1918.  Serial No. 240,735.

*To all whom it may concern:*

Be it known that I, WILLIAM B. KNICKERBOCKER, a citizen of the United States, residing at Jackson, in the county of Jackson and State of Michigan, have invented certain new and useful Improvements in Woodworking-Machines, of which the following is a specification.

My invention relates to improvements in wood-working machines.

One of the objects of my invention is to provide a saw frame structure, to which may be removably attached an auxiliary, universal frame providing a rotatable mandrel to which may be secured suitable tools, by the use whereof boring, joining, planing, grooving, sanding, and grinding may conveniently be accomplished.

A more specific object of my invention is the provision of a saw table structure in which there is included a swinging frame carrying a saw mandrel or arbor for a cross-cut saw, and means to lock the swinging frame in selected fixed position, so that the saw mandrel may be maintained in axial alinement with and clutched to an arbor or mandrel carried by the said auxiliary frame. Furthermore the invention comprehends an organized saw-frame and table structure having a swinging mandrel for operation when a cross-cut saw is used and arranged to be locked in a selected place when the cross-cut saw is to be replaced by a rip saw.

Other and further objects of my invention will become readily apparent, to persons skilled in the art, from a consideration of the following description when taken in conjunction with the drawings, wherein:—

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a section taken on line 6—6 of Fig. 2.

Fig. 7 is a section taken on line 7—7 of Fig. 6.

Fig. 8 is a plan view of a planer guard.

In all the views the same reference characters are employed to indicate similar parts.

Figure 1:
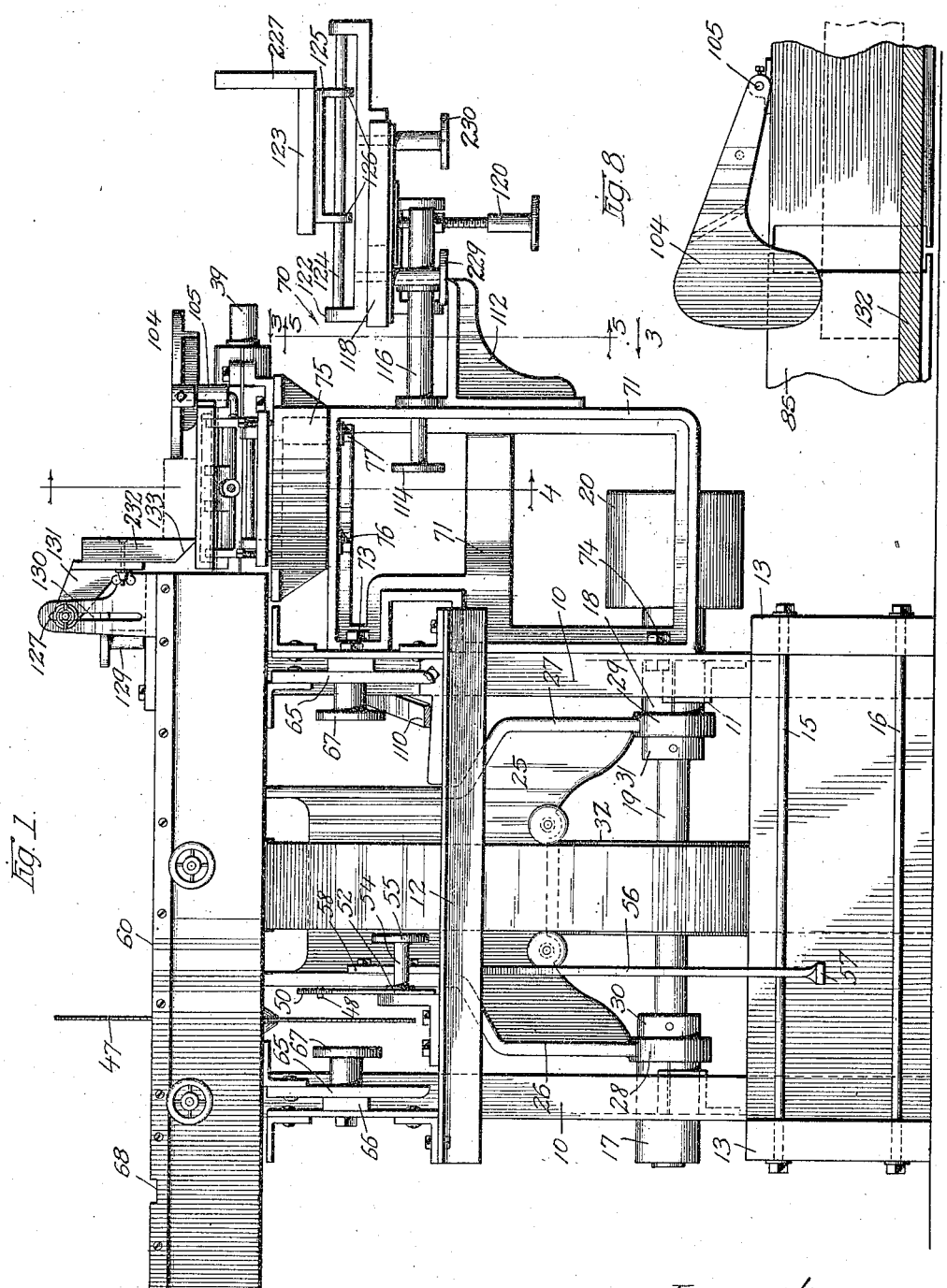
Figure 1 is a side elevation of the saw frame and table showing my universal wood worker attachment connected thereto.

The saw frame structure consists of the four vertical legs 10, which may be of angle iron, connected together by cross beams, or members 11, and by other cross members 12. Around the bottom ends of the legs 10 is a box structure made up of wooden side members 13 and end members 14, held together by bolts 15 and 16, to provide an extended base for the saw table.

On the cross frame members 11 is secured shaft bearings 17 and 18 for the driving shaft 19. On the overhanging end of the shaft 19 is secured a driving pulley 20 to be driven by a belt 21 from any suitable source of power. A tightener pulley 22 is secured to a frame 23, that is pivoted as at 24, to the saw table frame. The weight of the frame 23 and the pulley serves as a means to maintain the belt 21 sufficiently taut, the lower side of the belt 21 being the pulling or driving side, the slack being thus taken up in the upper flight of the belt.

A swinging saw-carrying frame 25 is provided with downwardly extending arms 26 and 27, terminating in bearings 28 and 29, respectively. These bearings 28 and 29 surround the shaft 19, upon which the frame 25 is thus pivoted and about which it is movable. Separating collars 30 and 31 hold this frame in proper position with reference to the bearings. On the driving shaft 19 is mounted a pulley 32. The upper end of the saw-frame 25 carries arbor bearings 34 and 35, within which a saw arbor 36 is rotatable. One member, 37, of a clutch, is secured to the outer end of the mandrel 36, for coöperation with another clutch member 38, which is fixed to the confronting end of the fixedly resident mandrel 39. A relatively small pulley 40 is secured on the mandrel 36 to receive the belt 41, which is driven by the pulley 32. A tightener pulley 42 is carried by a frame 43 which is pivoted to the frame, as at 44, and adjustable by a hand wheel 45 to tighten the belt.

The saw frame 25 is rotatable about the mandrel driving shaft 19 whereby the mandrel 36 may be bodily oscillated. The mandrel may carry interchangeably, either a rip saw or a cross-cut saw 47.

On one side of the frame 25, and projecting laterally therefrom, is a pin 48 for engagement with either of notches 49, to be selected, in a curved bar 50. The bar 50 is pivoted to the frame, as at 51, and extends across the frame and its other end is downturned at 52 and slotted, as at 53. The slot 53, of the bar 50, passes over the stem 54 of a hand wheel 55. When it is desired to swing the saw uninterruptedly on the frame 25, the bar 50 is first raised and the hand wheel is turned to clamp it so that the bar will be entirely out of the way of the pin 48 when the saw frame 25 is oscillated. For operation of the cross-cut saw, the saw frame 25, may be oscillated by a foot lever 56, the outer end 57 of which is out-turned conveniently for the application of the foot to provide the necessary pressure. The lever 56 is secured to the frame 25, as at 58. Now it will be apparent that when pressure is applied to the lever 56, by the foot of the operator, the saw will be brought forward and an object to be cut, by the cross-cut saw, may be held upon the table 60 against a suitable stop. A spring 61 is connected to the frame and also to the saw frame 25, as at 62. This spring yieldingly pulls the frame over in the direction opposite to that in which it is placed by application of foot pressure to the lever 56. When it is desired to place the saw frame 25 in a suitable position, the arm or lever 50, may be raised and the saw frame moved until the pin 48 comes under any one of the notches 49 provided in the underside of the arm 50. After the pin 48 has entered the selected notch, the lever 50 is then depressed and the hand wheel 55 is tightened, thus clamping the lever and holding it in position, and maintaining the axis of the saw in the desired plane. The saw table 60 is pivoted to one side of the frame, as at 64. The free end of the saw table 60 is provided with two pivoted, slotted depending legs 65, which pass between a block 66 and the hand wheel 67. By this means the saw table may be raised to a greater or less extent and held in adjusted position by the hand wheels 67 engaging the legs 65, and thus holding the table in its elevated, raised position, the table being movable on the hinge 64. The bed or upper surface of the table 60 is provided with grooves 68 which are substantially parallel with the face of the saw and in this groove a suitable guide may be located, serving as a means coöperating with the saw to regulate the width of the boards that are to be ripped by the saw.

The structure which I have just described is a saw table structure having a swinging mandrel upon which the saw is mounted, and which is capable of its intended use without the universal wood working attachment which I have provided to perform the many additional functions in association with the saw table.

The universal wood working attachment is a self-contained structure and is capable of being attached to the saw frame heretofore described, by means of four bolts. It is adapted to be driven by the saw mandrel 36 when the latter is in proper alinement with the spindle or mandrel 39 of the attachment.

The attachment 70 comprises side frame members 71 and 72, each member being secured to the saw frame on each side by the screws or bolts 73 and 74. The members 71 and 72 are also held together by a table 75 which is attached to the frame members by the screws or bolts 76 and 77. Mounted on the bed 75 are spaced apart bearings 78 and 79 for the mandrel 39.

Secured to the mandrel 39 is a planer and edger 80, upon which the planer knives 81 and 82 are adjustably secured by screws 83 and 84, respectively. A two-part vertically and laterally adjustable table 85—86 is superposed above the planer and edger. The table part 85 is supported upon the links 87 and 88 and the table part 86 is supported upon the links 89 and 90. To vary the longitudinal adjustment of the table members, 85 and 86, or their distance of separation, and at the same time to change their heights, the inclination of the links is varied by the screws 91 and 92, when the hand wheels 93 and 94, respectively, are turned. Brackets 96 are secured to the upper part of the table 75 and the screws 91 and 92 pass freely through these brackets. Nuts 98, on the screws 91 and 92, are means by which the table members, 85, and 86, may be held firmly in adjusted position. To raise the table members, 85 and 86, it is only necessary to rotate the hand wheels 93 and 94 so that the links may occupy a more nearly vertical position, and to lower the table members, it is only necessary to rotate the hand wheels in the opposite direction, to give greater inclination to the links. After the proper adjustment has been made the screws 98 may be tightened and the table members, 85 and 86, will be firmly held in the adjusted position. A frame 99, of which there are two, one of which is provided for each pair of links intended to operate the respective table members, 85 and 86, is supported on the table 75. The links, 87 and 88, on one side of the mandrel 39, are pivoted to the frame 99, while the links of the other frame members are pivoted to a similar table. The frame member 99 may be changed in its elevation, thereby giving greater adjustable possibility to the links 86 and 88, and 89 and 90, to raise and lower the respective table members 85 and 86, by means of screws 100. When the inclination of the links is not sufficient of themselves to raise the table members 85 and 86 to the proper height, then the frames 99 may be raised by the screws 100 and final adjustment in smaller increments may be accomplished by rotating the hand wheels 93 and 94.

A planer knife-guard 104 is pivoted to the table 86, as at 105, and is designed to cover the space between the table members 85 and 86, through which the knives of the planer and edger project. The guide is automatically held in position to cover the opening by spring 107 which is fixed to the table 86, as at 108, and to a curved end of a stem 109 that is secured to the guide 104.

After the mandrels 36 and 39 are brought into proper axial alinement and secured in the manner heretofore described, and it is desired to rotate the mandrel 39, by operation of the mandrel 36, the clutch 38 is moved longitudinally of the mandrel 39 into connection with the clutch member 37 on the mandrel 36, by a clutch shifting lever 110, which is pivoted, to the frame, as at 111.

Figure 2:
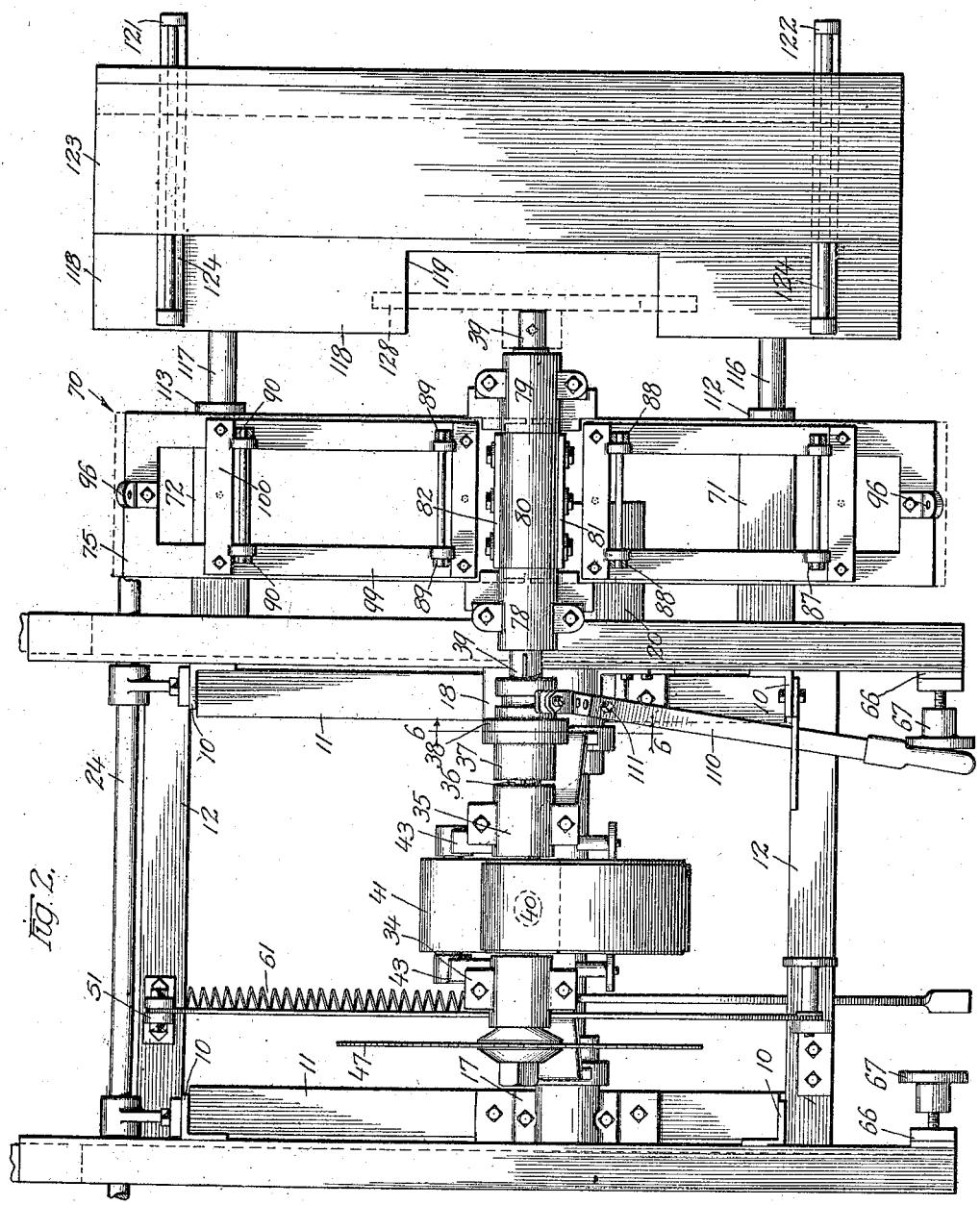
Fig. 2 is a plan view of the same with the saw table removed.

Secured to the side frame members 71 and 72, respectively, are brackets 112, 113, held in place by the hand screws 114, one for each bracket, and vertically adjustable in perforations 115, provided through each of the frame members 71 and 72 to change the altitude of the members. Projecting from and secured to the respective brackets, are outwardly projecting parallel stud members 116, 117. Slidable on the studs 116, 117, is a table 118, provided with a notch 119 or cut away part for a sand disk or emery wheel or the like, shown in dotted lines in Fig. 2 as connected to the mandrel 39. The table 118 may be held in adjusted position by the hand wheels 120. Mounted upon the upper surface of the table 118 are guide ways 121, 122, for another table 123. Rods 124 are secured in the guide ways 122, and the table 123 carries a part 125, having downturned ears 126, for sliding engagement with the rods. Secured to the outer edge of the table 123 is a vertical support 127.

A bracket member having upwardly projecting brackets 127 and 128 is removably secured to the saw table 60, by a hand wheel 129. The upwardly projecting members are slotted, as at 130, to receive bracket members 232. These latter bracket members are each connected to opposite ends of the board 132. The guide ways 121 and 122 may be removed from the table 118 by unscrewing the hand wheels 229, 230, whereupon the table 118 may be used independently and without the presence of the table 123.

One of the advantages of having a separate, organized, detachable and universal wood worker, attachable to the saw frame and operated by the same power that is employed for rotating the saw spindle, is the contraction of the space in which the mechanism may be contained. The universal wood worker does not in any way interfere with the proper use and operation of the saw table structure, when wood is being ripped or cut cross-wise by the respective saws.

Of course boring bits, drills, broaches or the like may be secured to the outer end of the mandrel 39, or in a removable chuck that may be secured thereto, and other such rotary tools, adaptable for wood working operations, may be driven by said mandrel to extend the useful effective operation of the universal attachment.

While I have herein shown and described a single embodiment of my invention for the purpose of clear disclosure, it will be manifest to persons skilled in the art that many changes in the general configuration and disposition of the parts may be made in the structures within the scope of the appended claims.

Having described my invention, what I claim is:—

1. In combination with a saw table comprising two spaced-apart side frame members; a table top mounted thereon; cross beams carried by the frame members; a saw driving shaft mounted on said cross beams; a saw frame rotatably movable about said driving shaft and located between said cross frame members; a saw mandrel carried by said frame; pulleys on said shaft and mandrel; a belt connecting said pulleys to drive the mandrel; a secondary frame attachable to the main frame; a mandrel carried by the secondary frame; a clutch member on each said mandrel to connect said mandrels together in coaxial relation and means to hold the saw mandrel in position to be clutched to the secondary mandrel.

2. In combination with a saw table, comprising two spaced apart side frame members; a table top mounted thereon; cross beam members carried by the frame members; a saw driving shaft mounted on said beams and projecting therebeyond; a driving pulley on the projecting end of said shaft; a saw frame having one end loosely mounted on said driving shaft and located between said frame members and prevented from axial movement thereby; a saw mandrel carried by said frame; pulleys on said shaft and mandrel; a belt connecting said pulleys to drive the mandrel; a secondary frame attachable to one said side frame member; a mandrel carried by the secondary frame; a clutch member on the saw mandrel; a slidable clutch member on the secondary mandrel and a lever for moving the said slidable member into connection with said saw mandrel to join said mandrels together and means to hold said saw frame in position to permit said mandrels to be connected together in a manner described.

3. In a device of the character described, the combination of a saw table and frame structure, having a swinging saw mandrel movable about a driving shaft; a driving shaft mounted on the frame structure, carrying the saw frame; means to secure the mandrel in selected position while permitting its rotation; a spring for moving the saw frame in a given direction, when released; a lever for moving the saw frame in the opposite direction; means to hold the saw frame in selected position; a secondary frame attachable to the saw frame structure; a mandrel carried by the latter frame; a clutch member carried by the saw mandrel; a clutch member carried by the secondary mandrel and a lever pivoted to the saw frame to move the clutch member of the secondary mandrel into and out of engagement with the clutch member carried by the saw mandrel.

In testimony whereof I hereunto subscribe my name.

WILLIAM B. KNICKERBOCKER.

Copies of this patent may be obtained for five cents each, by addressing the "Commissioner of Patents, Washington, D. C."